March 14, 1967   D. J. KULLMANN   3,308,664
TAMPER-PROOF METER
Filed Oct. 24, 1965   2 Sheets-Sheet 1
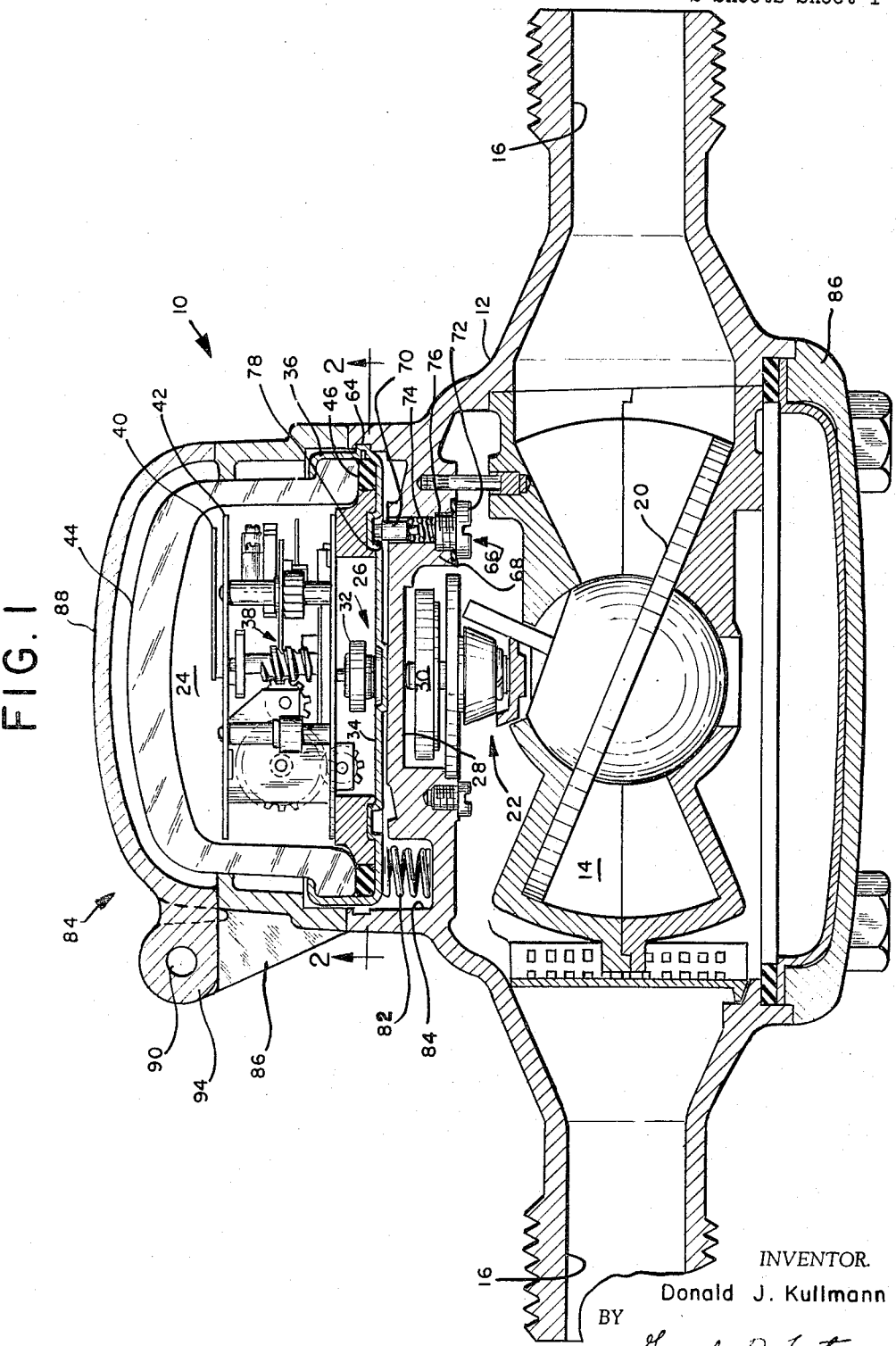
INVENTOR.
Donald J. Kullmann
BY
*Lewis P. Foster*
Attorney March 14, 1967  D. J. KULLMANN  3,308,664
TAMPER-PROOF METER
Filed Oct. 24, 1965  2 Sheets-Sheet 2
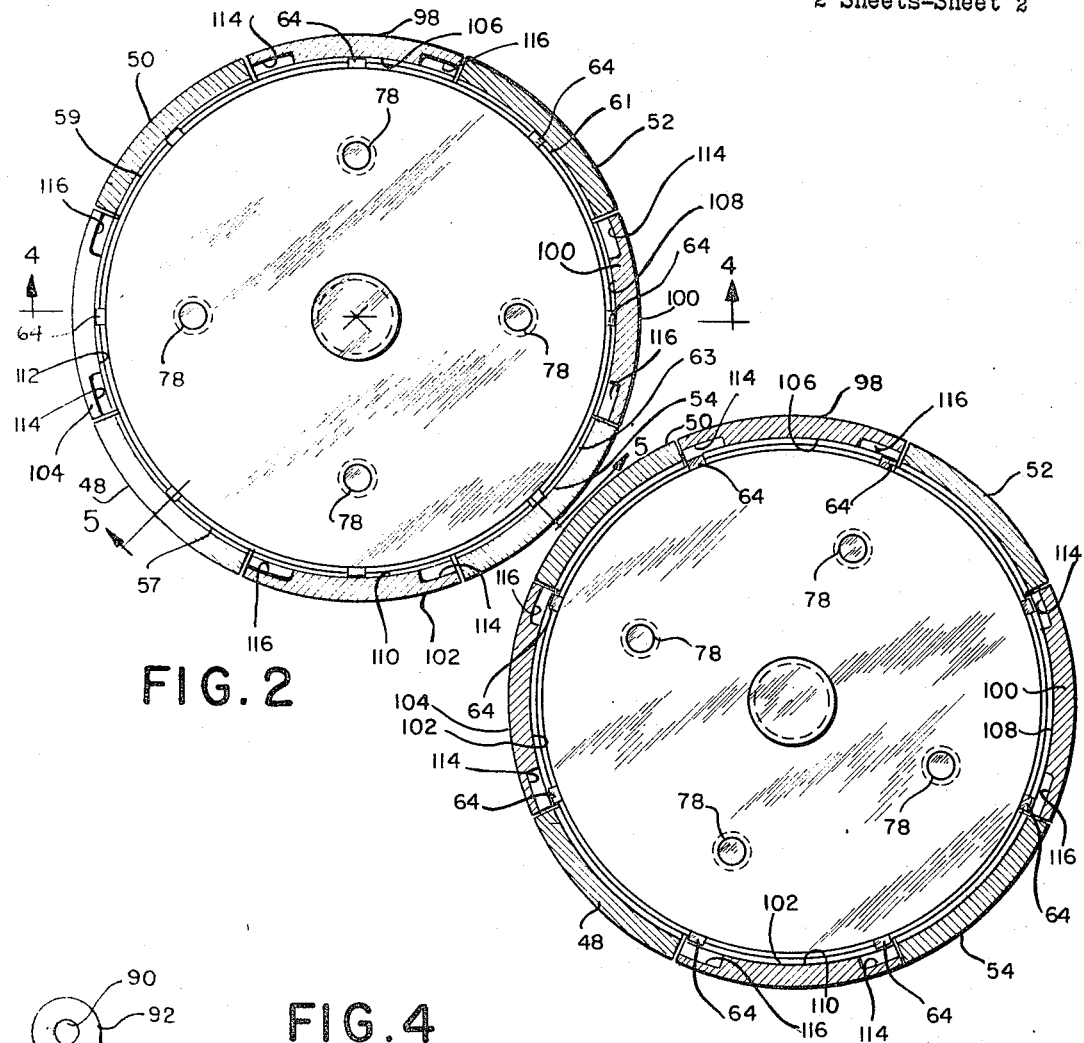
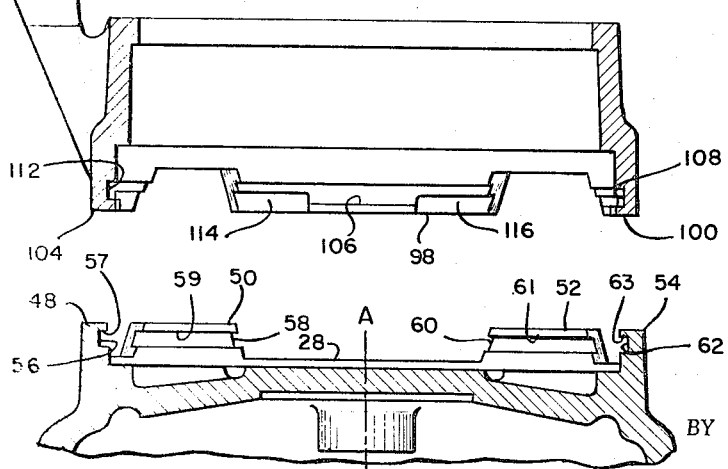
INVENTOR.
Donald J. Kullmann
BY
Attorney United States Patent Office 3,308,664
Patented Mar. 14, 1967

3,308,664
TAMPER-PROOF METER
Donald J. Kullmann, Milwaukee, Wis., assignor to Badger Meter Manufacturing Company, Milwaukee, Wis., a corporation of Wisconsin
Filed Oct. 24, 1965, Ser. No. 515,282
11 Claims. (Cl. 73—273)

This application is a continuation-in-part of a co-pending application of Donald J. Kullmann, Ser. No. 282,385, filed May 22, 1963 now abandoned and assigned to the assignee of this application. This application and the above identified Donald J. Kullmann application, Ser. No. 282,385, have subject matter in common with a prior filed, now abandoned, application of Donald J. Kullmann, Ser. No. 95,728, filed Mar. 14, 1961, and assigned to the assignee of this application; as to that common subject matter, which will be pointed out hereinafter, this application claims the filing date of application Ser. No. 95,728.

This invention relates to fluid flow meter constructions of the type including separable meter housing and meter registering units and, more particularly, to a connection between the meter housing and registering units which provides a tamper-proof meter assembly.

Accordingly, a principal object of this invention is to provide a tamper-proof meter assembly.

Another object of this invention is to provide a connection between separable meter housing and registering units which permits ready connection of the meter housing and registering unit while resulting in a tamper-proof meter.

A further object of this invention is to provide an improved interlocking arrangement between the registering unit and the meter housing.

Although not limited to any specific meter construction, this invention will perhaps find its widest application in meters which comprise a housing through which the liquid being measured passes and which includes a suitable flow sensitive mechanism arranged in the path of the fluid; a separable sealed registering unit is mounted on the housing and a connection through the walls of the housing and the registering unit, such as a magnetic coupling, transmits motion of the flow sensitive mechanism to the registering unit. To achieve the above and other objects of this invention, it is proposed to provide the separable housing and registering unit with holding surfaces which are relatively arranged for movement into engagement with each other to prevent separation of the registering unit from the housing and a locking mechanism which establishes a locking connection between the housing and registering unit when the holding surfaces are engaged to prevent relative movement between the housing and registering unit to free the holding surfaces. Preferably, the holding surface (or surfaces) is constructed and arranged to be parallel to the plane of relative movement between the registering unit and the meter housing so that relative movement of the registering unit and housing to engage the holding surfaces occurs without a component intersecting the plane of relative movement and the holding surface (or surfaces) can be more readily machined.

Preferably, the locking mechanism is enclosed and accessible to free the registering unit and the meter housing for movement to disengage the holding surfaces only after a complete disassembly of the meter housing portion of the meter.

It is also an object of the invention to provide a construction which will afford the tamper-proof characteristics and which is adaptable to use with or without the meter hood assembly which is often provided to enclose and protect the registering unit. In accordance with this invention the hood assembly is also provided with holding surfaces which interlock with the meter housing and the registering unit in such a manner as to prevent separation thereof without complete disassembly of the meter.

Other objects and advantages will be pointed out in, or be apparent from, the specification and claims, as will obvious modifications of the embodiment shown in the drawings, in which:

FIG. 1 is a longitudinally section view through a preferred embodiment of this invention;

FIG. 2 is a section view taken generally along lines 2—2 of FIG. 1 and illustrating the meter components in their locked positions;

FIG. 3 is a partial section view generally along the same lines 2—2 of FIG. 1 illustrating the meter components in their unlocked position;

FIG. 4 is a partial section view of the hood portion of the meter taken generally along lines 4—4 of FIG. 2; and FIG. 5 is a partial section view of the upper portion of the meter housing taken generally along lines 5—5 of FIG. 2.

With particular reference to the drawings, a fluid flow meter 10 includes a meter housing 12 having a nutating disk chamber 14 and inlet and outlet openings 16 and 18 to provide for ingress and egress of water to and from the nutating disk chamber. In a manner well known in the art, the passage of water produces nutation of disk 20, this nutating motion being converted into rotary motion of magnetic coupling 26 by means 22 so that rotary motion is transferred to registering unit 24. The mechanism for transmitting motion between the meter housing and the registering unit can take any suitable form but is preferably a magnetic coupling of the type disclosed and claimed in the co-pending U.S. patent application of Donald J. Kullmann entitled "Magnetic Coupling," Ser. No. 243,095, filed Dec. 7, 1962, now Patent No. 3,248,583 and assigned to the assignee of this application. Reliance is placed on the co-pending Kullmann application for a complete description of the magnetic coupling and the transmission of motion between the meter housing and registering unit, for the purposes of this application the following description is believed to be sufficient. That is, meter housing 12 includes an imperforate wall 28 having a magnet 30 positioned adjacent its inner face and connected to and rotatable in response to means 22. A second magnet 32 is co-axially arranged with magnet 30 and is located adjacent the inner face of imperforate wall 34 of registering unit base 36. Magnet 32 is connected through drive mechanism 38 to a pointer 40 so that movement of magnet 32 is transmitted to and drives pointer 40 with respect to suitable indicia (not shown) provided on panel 42 to provide a visual read-out for the meter.

Structurally, the registering unit 24 includes an outer housing comprising the base 36 and a dome 44 of suitable transparent material such as glass. A gasket 46 cooperates in providing a sealed connection between base 36 and glass dome 44 so that the registering unit is a sealed assembly.

In order to provide a tamper-proof meter assembly, an interlocking connection is provided between registering unit 24 and meter housing 12 which prevents separation of the registering unit from the meter housing without completely dissembling the meter. More particularly, four lugs 48, 50, 52 and 54 extend laterally from imperforate wall 28 of the meter housing with each lug being provided with an inwardly facing notch 56, 58, 60 and 62. The lugs are equi-angularly spaced about an axis A—A extending through the center of imperforate wall 28 and notches 56–62 are arcuately arranged about that axis and in relative alignment. Radical projections 64 are provided on registering unit base 36 and are arranged in relative alignment with each other to fit into notches 56–62 on the meter housing to prevent separation of the registering unit from the meter housing by movement in the direction of axis A—A which, as shown in FIG. 4, is normal to the plane of wall 28. As shown in the drawings, the notches 56–62 of the meter housing lugs include oppositely facing walls or surfaces which are respectively aligned in planes normal to the axis A—A, said surfaces, as shown, being parallel to each other and axially spaced to snugly receive between them the radial projections 64 on the register unit assembly (see FIG. 1).

This combination of notches and projections provides inter-engaging surfaces which prevent relative movement between the registering unit and the meter housing in one direction and, to complete a tamper-proof connection, a mechanism 66 is provided to prevent rotation of the registering unit about axis A—A when the projections are engaged within the lug notches. Preferably, mechanism 66 is mounted in a boss 68 provided at imperforate wall 28 of the meter housing and structurally it includes a detent pin 70, a headed screw 72 and a coil spring 74 seated between the detent pin and the screw. Lock screw 72 is threaded into a through hole 76 in boss 68 from within meter housing 12 so that its head is accessible only from the interior of the meter housing. Spring 74 biases detent pin 70 outwardly of imperforate wall 28 toward the registering unit. Four indentations 78 are formed in wall 34 of registering unit base 36 and are equi-angularly spaced about the center of the registering unit base or, when assembled on the meter housing, about axis A—A. The indentations are so arranged that when the registering unit is positioned on the meter housing for rotation of projections 64 into notches 56–62 the detent pin 70 is positioned in the path of rotation of indentations 78. With this arrangement, as registering unit 24 is rotated to engage the projections in the notches, one of the indentations 78 will be moved into alignment with detent pin 70 whereupon the pin will move outwardly into the indentation to lock the registering unit against further rotation relative to the metering housing.

Preferably a coil spring 82 is seated in each of three recesses 84 (only one of which is shown in the drawing) in imperforate wall 28 of the meter housing, these springs engage the wall 34 of the registering unit as it it assembled onto the meter housing and urge the registering unit upwardly to maintain continuous engagement of projections 64 with the upper surfaces 57, 59, 61 and 63 of the lug notches. Furthermore, springs 82 serve to cushion the registering unit against shock and, by providing a continuous load on the registering unit to maintain engagement with the upper surface of the lug notches, provides a tight and relatively rattle-free meter assembly. In assembly, the registering unit is positioned on the meter housing with its wall 34 engaging imperforate wall 28 of the meter housing and with projections 64 located in the spaces between the lugs 48–54 (see FIG. 3). The registering unit is rotated about axis A—A to position projections 64 within notches 56–62 and until detent pin 70 engages one indentation 78 (see FIG. 2). With the registering unit so positioned, it cannot be rotated relative to the meter housing and projections 64 cannot be removed from the lug notches thereby preventing separation of the two assemblies. To release the registering unit for separation from the meter housing access must be had to screw 72 to release pin 70 and this can only be achieved by disassembly of the meter housing. More particularly, a lower base plate 86 and the nutating disk assembly must be removed to gain access to screw 72.

Meters of the type in which this invention has particular application are generally provided with a protective hood which fits over and protects glass dome 44 from damage. The protective hood can either be an integral part of a registering unit assembly, which includes the register mechanism, or can be separate from the register mechanism; in the illustrated embodiment the latter construction is used as the more specific aspects of this invention, although not limited to any particular construction, lend themselves well to that construction. Moreover, the tamper-proof connection of this invention has the particular advantage that it is equally well suited to use with or without a protective hood. With reference to FIG. 1, a hood assembly 84 includes a base portion 86 and a cover portion 88. A pin 90 extends through a pair of ears 92 on the hood portion and a hub 94 in the base portion to provide a pivotal connection between the cover and base portion. Four lugs 98, 100, 102 and 104 are provided on base portions 88 and each includes a generally arcuate notch 106, 108, 110 and 112. The hood lugs are constructed to fit in the spaces provided between the housing lugs and when so positioned the notches 106–112 thereof are generally aligned with the notches in the meter housing lugs. The notches of the hood lugs provide oppositely facing surfaces as shown in FIG. 4, which are parallel to each other and are respectively aligned in planes normal to the axis A—A and are axially spaced to snugly receive the radial projection 64 of the register unit asembly. Thus when the hood and housing members are operatively engaged as shown in FIG. 1, the notches 56–62 of the meter housing and the notches 106–112 of the hood, are aligned in a plane normal to the axis A—A and form an annular channel within which the radial projections 64 of the register unit assembly may move when the meter is assembled. It will be noted that relief portions 114 and 116 are provided at opposed ends of each of the hood lug notches, these cut-out portions being provided to assist in the assembly of the meter as will be more completely described hereinafter.

To assemble the hood onto the meter assembly, and assuming that the registering unit is already positioned on the meter housing with the projections 64 thereof positioned in the spaces between the meter housing lugs 48–62 (see FIG. 3), the hood assembly is placed onto the meter housing in surrounding relationship with the registering unit 24. The cut-out portions 114 and 116 in the hood lugs provide clearance for the projections 64 on the registering unit base. With this arrangement the hood and meter housing lugs are alternately arranged with each other to provide an interlocking arrangement which prevents rotation of the hood assembly relative to the meter housing. The registering unit is pressed against the bias of springs 82 and is rotated to position the projections 64 within the registering unit and meter housing lug notches. The registering unit will rotate until detent pin 70 is engaged in one of the indentations 78 and with the detent pin so engaged, the projections 64 are alternately positioned in the meter housing and registering unit notches as illustrated in FIG. 2. The upper surfaces of the meter housing notches prevent removal of the registering unit, the lower surfaces of the hood prevent removal of the registering unit to free the projections from the notches so that the housing, registering unit and hood cannot be freed for separation without removal of the base plate 80 of the meter housing for access to lock screw 72 as was described above. This arrangement positively locks the meter housing, registering unit and hood assembly into a unitary and tamper-proof meter construction. It will also be noted that oppositely facing surfaces of the notches of the hood and meter housing lugs being arranged normal to axis A—A are also arranged parallel to the plane of relative movement of the housing and register unit and permit movement of the registering unit without an axial component. Moreover, this arrangement of the notch surfaces permits fabrication of the notches using economical machining techniques.

The basic interlocking engagement between the register unit assembly, with or without the hood, and the meter housing and which is characterized by means providing for relative rotational movement between the register unit assembly and the meter housing without requiring relative axial movement therebetween, is the matter which is common to this application and the aforementioned prior co-pending applications of Donald J. Kullmann, Serial No. 95,728 and Serial No. 282,385.

Although but one embodiment of the present invention has been illustrated and described, it will be apparent to those skilled in the art that various changes and modifications may be made therein without departing from the spirit of the invention or from the scope of the appended claims.

I claim:

1. A tamper-proof fluid flow meter comprising, in combination, a meter housing and registering unit arranged for relative rotational movement therebetween about an axis extending through said meter housing, first means for holding said meter housing and said registering unit against movement parallel to said axis and including a plurality of lug members relatively spaced about said axis and each having a radially disposed surface on and facing toward one of said meter housing and said registering unit and second radially disposed means on the other of said meter housing and registering unit arranged for engagement with said radially disposed surfaces, and locking means provided on said meter housing and arranged for engagement between said meter housing and registering unit when said second means are engaged with said surfaces and operative to prevent relative rotational movement between said meter housing and said registering unit, said locking means arranged for access from within said meter housing and including a detent member on one and means for engaging said detent member on the other of said meter housing and registering unit and also including means biasing said detent member toward the other of said meter housing and registering unit for engagement with said detent member engaging means.

2. A tamper-proof meter comprising, in combination, a meter housing, a registering unit connected to said meter housing, a hood assembly adapted to fit over and enclose said registering unit, first means engaged between said meter housing and said hood assembly to prevent movement therebetween about an axis extending through said meter housing, said first means including a plurality of relatively spaced lug members extending axially of each of said meter housing and said hood assembly with said meter housing and hood lugs alternately arranged about said axis and on the same radius, means on each of said meter housing and said hood assembly defining a surface on said meter housing facing toward said meter housing and a surface on said hood assembly facing toward said hood assembly and away from said meter housing, said registering unit including a plurality of relatively spaced projections extending radially relative to said axis and arranged for engagement with said surfaces to prevent relative axial movement of said meter housing, said registering unit and said hood assembly, and locking means arranged for access from within one of said registering unit and meter housing and including a detent member on one and means for engaging said detent member on the other of said meter housing and said registering unit and also including means biasing said detent member toward the other of said meter housing and said registering unit for engagement with said detent member engaging means to lock said registering unit against movement about said axis when said means on said registering unit is engaged with said surfaces.

3. The tamper-proof meter of claim 2 wherein said detent member is mounted on said meter housing and is accessible from within said meter housing for releasing said detent member to free said registering unit for movement about said axis.

4. The tamper-proof meter of claim 3 wherein each of said lug members includes a notch defining opposed surfaces, said notches arranged for receipt of said projections and said opposed notch surfaces providing the surfaces engageable with said registering unit projections to prevent relative axial movement of said meter housing, registering unit and hood assembly.

5. A tamper-proof meter comprising, in combination, a meter housing, a plurality of lugs on said housing relatively spaced about an axis extending through said housing and each including a radial surface facing toward said meter housing, a registering unit including a plurality of relatively spaced projections arranged for engagement with said surfaces to prevent axial movement between said meter housing and registering unit, a hood member adapted to fit over and enclose said registering unit and including a plurality of lugs extending toward said meter housing and arranged to fit between the meter housing lugs, said hood lugs including a radial surface facing away from said meter housing toward said hood and arranged for engagement with said projections on said registering unit, detent means mounted in said housing and biased toward said registering unit, means on said registering unit arranged for engagement with said detent means to prevent movement of said registering unit about said axis when said projections are engaged with said surfaces, means arranged for access from within said meter housing and operative to release said detent means to free said registering unit for movement, and spring means seated between said registering unit and said meter housing for biasing said registering unit outwardly of said meter housing.

6. A tamper-proof meter comprising, in combination, a meter housing including a plurality of lugs relatively spaced about and extending parallel to an axis extending through said meter housing, said lugs defining a register receiving area and each lug including means defining a notch opening into said area and having a radially disposed surface facing toward said meter housing, a hood arranged on said meter housing and including a plurality of relatively spaced lugs extending toward said meter housing and arranged about said axis between and engaged with said meter housing lugs, means on said hood lugs defining notches opening into said area and each having a radial surface facing away from said meter housing toward said hood, a meter register unit disposed in said area for movement about said axis and including a plurality of projections defining oppositely facing radially disposed surfaces relatively spaced in accordance with the spacing of said meter housing and hood lugs and arranged for movement into said notches as a result of movement of said registering unit about said axis, said register unit projections, when engaged with said meter housing and hood radial surfaces, holding said register unit and hood against axial movement with respect to said meter housing, and locking means arranged for engagement between said meter housing and said registering unit and operative, when said projections are engaged with the surfaces of said lug notches, to lock said registering unit against rotation and said locking means arranged for access from within said meter housing to release said locking means.

7. A tamper-proof meter comprising, in combination, a meter housing, a registering unit connected to said meter housing, a hood assembly adapted to fit over and enclose said registering unit, first means engaged between said meter housing and said hood assembly to prevent movement therebetween about an axis extending laterally of said meter housing, means on each of said meter housing and said hood assembly defining a surface on said meter housing facing toward said meter housing and a surface on said hood assembly facing toward said hood assembly and away from said meter housing, said registering unit including means arranged for engagement with said surfaces to prevent relative axial movement of said meter housing, said registering unit and said hood assembly, and locking means arranged for engagement with and operative to lock said registering unit against movement about said axis when said means on said registering unit is engaged with said surfaces, said locking means arranged for access from within one of said registering unit and meter housing and including a detent member on one and means for engaging said detent member on another of said meter housing and said registering unit and also including means biasing said detent member toward the other of said meter housing and said registering unit, said first means including a plurality of relatively spaced lug members extending from each of said meter housing and said hood assembly in the direction of said axis and with said meter housing and hood asssembly lug members alternately arranged about said axis and on substantially the same radius, said lug members including means defining opposed, radially disposed surfaces, and said means on said registering unit comprises a plurality of relatively spaced projections extending radially relative to said axis and arranged for engagement between said opposed surfaces on said meter housing and hood assembly.

8. A fluid flow meter comprising, in combination, a meter housing and registering unit assembly arranged for relative rotational movement therebetween in a first plane of movement and about an axis extending generally normal to said first plane of movement, first means for holding said meter housing and said registering unit assembly against movement parallel to said axis and including a first radially disposed surface extending parallel to said plane of movement, said radially disposed surface provided on and facing toward one of said meter housing and said registering unit assembly and a second surface on the other of said meter housing and registering unit assembly arranged for engagement with said radially disposed surface to hold said registering unit assembly and said meter housing against axial movement transversely of said first plane and whereby rotation of said register unit assembly to engage said first and second surfaces occurs without relative axial movement, and locking means arranged for access from within one of said registering unit and meter housing and arranged for engagement between said meter housing and registering unit assembly when said second surface is engaged with said first surface and operative to prevent relative rotational movement between said meter housing and said registering unit assembly said locking means including a detent member on one and means for engaging said detent member on the other of said meter housing and registering unit and also including means biasing said detent member toward the other of said meter housing and registering unit for engagement with said detent member engaging means.

9. The tamper-proof meter of claim 8 wherein said first means includes a plurality of lug members relatively spaced about said axis and having said first surface formed thereon.

10. A tamper-proof meter comprising, in combination, a meter housing, positive displacement flow responsive means within said housing, a registering unit connected to said meter housing and said flow responsive means and movable relative to said meter housing and said flow responsive means about an axis extending through said meter housing, a hood assembly adapted to fit over and enclose said registering unit, first means engaged between said meter housing and said hood assembly to prevent movement therebetween about said axis, means on each of said meter housing and said hood assembly defining a surface on said meter housing facing toward said meter housing and a surface on said hood assembly facing toward said hood assembly and away from said meter housing, said registering unit including means arranged for engagement with said surfaces of both said meter housing and said hood assembly and effective when so engaged to prevent relative axial movement of said meter housing, said registering unit and said hood assembly, and locking means arranged for engagement with and operative to lock said registering unit against movement about said axis when said means on said registering unit is engaged with said surfaces.

11. A tamper-proof meter comprising, in combination, a meter housing including a plurality of lugs relatively spaced about and extending parallel to an axis extending through said meter housing, said lugs defining a register receiving area and each lug including means defining a notch opening into said area and having a radially disposed surface facing toward said meter housing, a hood arranged on said meter housing and including a plurality of relatively spaced lugs extending toward said meter housing and arranged about said axis between and engaged with said meter housing lugs, means on said hood lugs defining notches opening into said area and each having a radial surface facing away from said meter housing toward said hood, positive displacement flow responsive means within said meter housing, a meter register unit disposed in said area and operatively connected to said flow responsive means, said meter register unit movable about said axis relative to said meter housing, said hood and said flow responsive means and including a plurality of projections defining oppositely facing radially disposed surfaces relatively spaced in accordance with the spacing of said meter housing and hood lugs and arranged for movement into said notches as a result of movement of said registering unit about said axis, said register unit projections effective when engaged in said notches to hold said register unit, hood and meter housing against axial movement, and locking means arranged for engagement between said meter housing and said registering unit and operative, when said projections are engaged with the surfaces of said lugs, to lock said registering unit against rotation.

References Cited by the Examiner

UNITED STATES PATENTS

| | | | |
|---|---|---|---|
| 855,190 | 5/1907 | Loetzer | 73—273 |
| 855,473 | 6/1907 | McAlpine. | |
| 1,377,985 | 5/1921 | Lambert | 73—273 |
| 2,041,762 | 5/1936 | Hazard et al. | 73—273 |
| 2,826,916 | 3/1958 | Lang | 73—273 |

FOREIGN PATENTS 22,205  10/1898  Great Britain.

RICHARD C. QUEISSER, *Primary Examiner.*

E. D. GILHOOLY, *Assistant Examiner.*